United States Patent [19]

Rapp

[11] Patent Number: 4,910,036

[45] Date of Patent: Mar. 20, 1990

[54] PROCESS OF TREATING VEGETABLES FOR USE IN A VEGETABLE OMELETTE MIX

[75] Inventor: Harold Rapp, Denville, N.J.

[73] Assignee: Nabisco Brands, Inc., East Hanover, N.J.

[21] Appl. No.: 293,296

[22] Filed: Jan. 4, 1989

[51] Int. Cl.$^4$ .................. A23L 1/32; A23L 1/195; A21D 2/36

[52] U.S. Cl. .................... 426/589; 426/321; 426/330.1; 426/578; 426/614; 426/615

[58] Field of Search ............ 426/330.1, 578, 661, 426/614, 615, 628, 589, 321, 626

[56] References Cited

U.S. PATENT DOCUMENTS

| | | | |
|---|---|---|---|
| 2,910,368 | 10/1959 | Melrick, et al. | 426/271 |
| 2,941,889 | 6/1960 | Welch | 426/628 |
| 3,063,847 | 11/1962 | Bunnows | 426/325 |
| 3,565,638 | 2/1971 | Ziegler et al. | 426/614 |
| 3,655,405 | 4/1972 | Karas. et al. | 426/120 |
| 3,840,683 | 10/1974 | Strong. et al. | 426/177 |
| 3,911,144 | 10/1975 | Strong et al. | 426/330.1 |
| 4,296,134 | 10/1981 | Boldt | 426/614 |
| 4,562,691 | 1/1986 | Rapparini | 53/512 |
| 4,564,527 | 1/1986 | Bucsko et al. | 426/615 |
| 4,752,495 | 6/1988 | Smith | 426/615 |
| 4,789,738 | 12/1988 | Friedman et al. | 426/578 |

Primary Examiner—Donald E. Czaja
Assistant Examiner—Helen Pratt
Attorney, Agent, or Firm—Richard Kornutik

[57] ABSTRACT

A low cholesterol vegetable omelette mix is prepared by blending a biologically-stable vegetable sauce with a low calorie liquid egg product. The vegetable sauce is prepared by a process comprising the following steps: mixing a starch and water to form a starch slurry; cooking the strach slurry; adding a food grade acidulent to form a sauce; adding chopped vegetables to produce a vegetable sauce with a pH of no more than 4.6; heating the vegetable sauce; cooling the vegetable sauce; and aseptically packaging the vegetable sauce. After processing the vegetables in this manner, the vegetable sauce can be blended with a low cholesterol liquid egg product without microbiological contamination of the egg product. The resulting vegetable omelette mix can then be packaged for subsequent omelette preparation.

24 Claims, No Drawings

PROCESS OF TREATING VEGETABLES FOR USE IN A VEGETABLE OMELETTE MIX

BACKGROUND OF THE INVENTION

Eggs have long been considered to be among the most nutritionally valuable of foods for human consumption. Egg protein is of exceptional nutritional quality and is, in fact, used as a standard against which the nitritional efficiency of other food proteins are evaluated. Egg protein is found in both the white portion of the egg and in the yolk. Fat and cholesterol, however, are concentrated in the yolk. According to *Composition of Foods, Agricultural Handbook No.* 8, U.S. Department of Agriculture (1963), 100 grams of whole egg provides about 4 grams of saturated fat and 550 mg. of cholesterol.

It is now generally believed that high blood cholesterol levels in humans are implicated in the onset and/or severity of cardiovascular disease. The amount of saturated fat ingested is also, in some manner, believed to be a factor in promoting the development of elevated blood cholesterol levels. Polyunsaturated fat, i.e., linoleic acid, on the other hand, is considered to be effective in lowering cholesterol levels. With the emphasis now being placed on the importance of reducing the dietary intake of cholesterol and saturated fat, many medical and nutrition authorities recommend that the intake of a number of highly popular foods, including eggs, be restricted or that their use be eliminated entirely, in some instances. There is evidence that egg yolk cholesterol may be particularly effective in increasing the levels of cholesterol in the blood. As a result, many people have been required to reduce drastically the number of eggs in their diets and are thus deprived of foods which have traditionally been considered among the most enjoyable and nutritious.

There are a number of patents which are directed to providing egg products with organoleptic characteristics similar to whole eggs but having reduced calorie content and/or cholesterol levels. Exemplary of such patents are U.S. Pat. No. 3,207,609 to Gorman et al., U.S. Pat. No. 3,475,180 to Jones, and U.S. Pat. No. 3,563,765 to Melnick.

In order for a low cholesterol liquid egg product to be acceptable to the consumer, however, it must be substantially similar to whole eggs with respect to functional and organoleptic properties such as color. Color is extremely important, because it is the first impression imparted to the consumer, and, if such is not satisfactory, the possibility of acceptance of the egg product will be greatly diminished even though the other organoleptic and functional properties are satisfactory. Not only must the color of a low cholesterol liquid egg product be similar to raw whole eggs, but also, when the product is cooked, the color must be similar to that of cooked whole eggs, and, when the product is used for preparing cakes, it must impart to these products substantially the color normally imparted by whole eggs. U.S. Pat. No. 3,840,683 to Strong et al. ("Strong '683") discloses one technique by which the characteristic color of whole eggs is imparted to a cholesterol-free egg product (comprising egg whites, nonfat milk solids, and vegetable oil) with a mixture of beta-carotene and an extract of plant xanthophylls.

In order to prevent spoilage or microbiological growth, it is desirable to freeze the low cholesterol egg product for the purposes of storage and distribution. In the frozen state, the product will have a shelf life of about one year, allowing for orderly manufacturing, testing, storage, distribution, and marketing. If the product were refrigerated and not frozen, the shelf life would be about one week, a period of time too brief to allow for current distribution and marketing practices.

Consumer acceptability of low cholesterol egg products also requires that such products have acceptable organoleptic properties after freezing and thawing. However, many such products subjected to this sequence of steps tend to separate into two distinct layers. The top layer will be opaque, while the bottom layer will be relatively clear. The degree to which separation occurs is a measure of the freeze-thaw stability of the product. It is, of course, desirable that a low cholesterol egg product has a relatively high degree of freeze-thaw stability so that little or no separation occurs upon thawing, thereby enabling the consumer to use the thawed product directly without mixing. The viscosity of a low cholesterol liquid egg product should be substantially similar to that of whole fresh eggs, and the texture of the egg product when cooked (e.g., scrambled) should also be substantially the same as that of the cooked whole eggs. U.S. Pat. No. 3,911,144 to Strong et al. ("Strong '144") discloses one approach for producing a substantially cholesterol-free liquid egg product with a relatively high degree of freeze-thaw stability which involves incorporating xanthan gum in the product.

It has also been desired to incorporate vegetables in low cholesterol liquid egg products for preparation of a low cholesterol vegetable omelette mix. However, this has not been possible, because it was feared that the vegetables would contaminate the liquid egg product with microorganisms. Consequently, low cholesterol vegetable omelette mixes have not been commercially available, and, instead, consumers themselves have had to add vegetables to available low cholesterol liquid egg products at the time when they wish to make a vegetable omelette.

SUMMARY OF THE INVENTION

The present invention relates to a process of treating vegetables so that they are biologically stable and, therefore, suitable for packaging with liquid egg products. Biological stability is imparted to vegetables by adding the vegetables to a cooked sauce comprising starch, a food grade acidulent, and water. After the vegetable and sauce mixture is run through a vacuum chamber at elevated temperatures, heated, and cooled, it can be blended with a liquid egg product without risk of biological contamination. Although vegetables treated in this manner can be blended with any liquid egg product to form a vegetable omelette mix, they are particularly suited for use in conjunction with a low cholesterol liquid egg product.

DETAILED DESCRIPTION OF THE INVENTION

Biologically stable vegetables in accordance with the present invention are prepared by first mixing a starch and water to form a smooth slurry. The slurry is then cooked for 0.25 to 30 minutes, preferably 10 minutes at temperatures of 180° to 240° F., preferably 190° F. Cooking is preferably carried out in a steam jacketed kettle, although other heating means such as scraped surface heat exchangers may also be employed. After cooking, a food grade acidulent is added to form a sauce having a pH of 2.0 to 3.0, preferably 2.2. Alternatively, the food grade acidulent can be mixed with the starch and water prior to cooking to form an uncooked sauce with a pH of 2.0 to 3.0, preferably 2.2. Raw or processed vegetables are then added to the sauce to prepare a vegetable sauce. The vegetable sauce is then heated to 120° F. and passed through a vacuum chamber operating at 5 to 15 inches of Hg. The vacuum chamber removes oxygen which can cause spoilage and other gases which prevent uniform filling. Next, the vegetable sauce is heated for 0.5 to 10 minutes, preferably 2 minutes at temperatures of 200° to 240° F., preferably 220° F. The heated vegetable sauce is then cooled to less than 150° F., preferably 70°-80° F. After cooling, the vegetable sauce is aseptically packaged in presterilized containers under conditions that obviate the possibility of microbiological contamination of the product. Examples of such packaging techniques are disclosed by U.S. Pat. No. 4,562,691 to Rapparini and are available from Alfa-Laval Food & Dairy Co., 2115 Linwood Ave., Ft. Lee, N.J., FR Mfg. Corp., 2807 South Hwy 99, Stockton, Calif., and Scholle Corporation, 220 West North Ave., Northlake, Ill.

In preparing the sauce, any acid resistant, food grade starch is suitable. The preferred starch is a modified starch that has enhanced resistance to acidic hydrolysis (e.g., REZISTA starch from A. E. Staley Manufacturing Co.). The starch is present in the sauce in an amount of 3.5 to 6.5 wt.%, preferably 5.25 wt.%.

The acidulent for the sauce is any food grade acidulent including acetic acid, lactic acid, malic acid, citric acid, tartaric acid, fumaric acid, lemon juice, vinegar, and mixtures thereof. Of these acids, citric acid is preferred. When incorporated in the sauce, the acidulent is present in an amount of 0.4 to 1.0 wt.%, preferably 0.7 wt.%.

The water used to make the sauce is cold when the starch is added to it. The acidulent may be preblended with the starch or may be added separately after the sauce is heated to about 190° F. The water is present in the sauce in an amount of 92.8 to 96.10 wt.%, preferably 94.9 wt.%.

The vegetables which can be treated by the process of the present invention are wide ranging. For example, peppers, onions, peas, beans, carrots, cauliflower, broccoli, eggplant, chives, mushrooms, potatoes, chiles, tomatoes, and mixtures thereof are all suitable. A preferred mixture of vegetables is:

|  | Wt. % |
| --- | --- |
| frozen mushrooms | 38.0 |
| dehydrated potatoes | 10.5 |
| red peppers | 27.5 |
| green peppers | 15.0 |
| intermediate moisture onions | 9.0 |
|  | 100.0 |

Preferably, the vegetables are chopped up to make them more suitable for incorporation in an omelette.

The vegetable sauce has a vegetable-to-sauce ratio of 1:1 to 4:1, preferably 2:1. It is particularly important that this ratio and the quantity of acid in the sauce is at a level at which the vegetable sauce has a pH of 4.1 to 4.6, preferably 4.2. At this pH level, the vegetables will become biologically stable without an adverse acidic impact upon their flavor. To produce a vegetable sauce with a pH in the desired range, the vegetables will generally have a neutral or slightly acidic pH, while the sauce will have a pH of 2.0 to 3.0, preferably 2.2. Where acidic or basic vegetables are utilized, the amount of acid employed in this sauce can be adjusted to arrive at a vegetable sauce with a pH in the desired range.

The biologically stable vegetable sauce prepared by the above process is particularly suitable for blending with a liquid egg product to form a vegetable omelette mix. Although any type of liquid egg product can be utilized, it is particularly preferred that the liquid egg product be a low cholesterol liquid egg product like those of the Strong '683 patent or the Strong '144 patent which are hereby incorporated by reference. Typically, the weight ratio of liquid egg product to vegetable sauce ranges from 4:1 to 1:1, preferably 5:3. Besides omelette mixes, the biologically stable vegetables of the present invention can be used in stews, soups, sauces, salads, garnishes, and ethnic foods, including Mexican, Oriental, and Polynesian food products.

Typically, low cholesterol liquid egg products have as a major component liquid egg whites with minor amounts of a variety of other ingredients, including water, vegetable oil, vitamins, minerals, emulsifiers, stabilizers, pasteurization aids, and coloring. As noted above, a xanthan gum can also be utilized to impart freeze-thaw stability to the liquid egg product.

The egg white is responsible to a significant degree for providing the desirable organoleptic and functional characteristics of the liquid egg product. It is preferred that the principal protein source in the egg composition consist essentially of egg white. Other protein sources such as soya protein, whey, and casein derivatives, when present in the liquid egg product, seem to impart, in certain instances, an undesirable flavor and deleteriously affect the functional characteristics of the product. If very small amounts of these materials are present, their effect may not be sufficiently discernible to be detrimental.

The amount of egg white present in the liquid egg product itself may be from about 24 to about 99.0 percent by weight. Preferably, however, the amount of egg white present is from about 40 to about 99 percent and most preferably the egg white is present at a level of 99 percent by weight.

The water in the low cholesterol liquid egg product is used primarily to solubilize water soluble ingredients which are then blended into the egg product. In addition, the water does impart some degree of increased flowability to the product. The water is present in the low cholesterol egg product in an amount of 0 to 5 weight percent, preferably about 0.5 weight percent.

The vegetable oil used may be any edible vegetable oil such as corn, cottonseed, soybean, safflower, sunflower, peanut, rape seed, olive, and sesame oils, and mixtures thereof, with corn oil being preferred. The amount of vegetable oil present in the liquid egg product may vary widely. However, at high oil levels, the liquid egg product becomes soft and mushy when scrambled. Another reason for keeping oil content low is that the presence of oil increases the calorie content of the low cholesterol liquid egg product. When an oil soluble colorant or other ingredients are used in the product, however, it is recommended that they first be dissolved in a small amount of vegetable oil so that they can be dispersed substantially evenly throughout the liquid egg product. Further, small amounts of oil also seem to impart certain subtle organoleptic characteristics of real eggs (e.g., mouth feel and texture) to the egg product. It is, therefore, preferred that the liquid egg product contain from about 0 to about 13 percent by weight oil which is similar to the percentage of fat naturally present in whole eggs.

For the liquid egg product to be acceptable to the consumer, it should be colored so that it has the characteristic color of whole eggs. It is preferred that the colorant comprises a mixture of beta-carotene and approved F D & C food colorants (e.g., F D & C yellow #5 and #6) in suitable proportions and amounts to impart to the egg compositions the characteristic color of whole eggs. Beta-carotene is oil soluble and water insoluble, while F D & C yellow #5 and #6 are water soluble and oil insoluble.

The xanthan gum, present in the liquid egg product to impart freeze-thaw stability, is a complex polysaccharide derived from the microorganism *Xanthomonas Campestris*. Preferably, xanthan gum is used in conjunction with a plurality of gums. It has been discovered that a blend of xanthan gum, guar gum, and carrageenan is particularly effective in imparting freeze-thaw stability, syneresis resistance, satisfactory viscosity, and suitable texture. The gum blend is present in the low cholesterol liquid egg product in amounts of 0.05 to 0.5 weight percent, preferably 0.21 weight percent. The constituents of the blend are present in the blend in amounts of 40 to 90 weight percent, preferably 55 weight percent xanthan gum, 10 to 50 weight percent, preferably 35 weight percent guar gum, and 0 to 25 weight percent, preferably 10 weight percent carrageenan. Although xanthan gum is non-gelling, the additional use of guar gum permits the low cholesterol egg product to form an interrupted gel which is less stringy or gummy than non-gelling compositions and achieves improved freeze-thaw stability and syneresis resistance compared to the individual gums.

The low cholesterol liquid egg product used in the present invention can be formed by a variety of methods. In preparing this product, a major objective is to minimize foaming, which egg whites easily induce when subjected to agitation. Preferably, foaming is minimized by blending all the other ingredients into the egg whites with a Tri-Blender TM mixer manufactured by Ladish Co., Inc., Tri-Clover Division, Kenosha, Wis. The beta-carotene, oil soluble vitamins, other oil soluble components, and the gums are all pre-blended and introduced through a port near the throat of the Tri-Blender TM mixer. Water soluble ingredients (including the vegetable sauce) are also pre-blended with water and added to the egg whites. Dry ingredients are added through the funnel of the Tri-Blender TM either separately or in pre-blended form.

When all the ingredients are added to the egg whites, the mixture is heat pasteurized, cooled to a temperature suitable for preservation, and packaged. Optionally, the mixture may be homogenized after heating to the pasteurizing temperature. The egg mixture and the vegetable sauce mixture are metered as separate components into a container suitable for storage, distribution, and use by the end consumer.

EXAMPLES

Examples 1-5

The following vegetable sauces were prepared:

| Component | Example 1 | Example 2 | Example 3 | Example 4 | Example 5 |
|---|---|---|---|---|---|
| | Weight Percent | | | | |
| Water | 32.50 | 32.50 | 33.30 | 32.23 | 31.29 |
| Citric Acid | 0.24 | 0.24 | 0.25 | 0.27 | 0.24 |
| Starch | 1.45 | 1.45 | 1.45 | 1.50 | 1.47 |
| Red Peppers | 18.00 | 28.00 | 12.00 | | 18.00 |
| Green Peppers | 10.00 | | 6.00 | | |
| Dehydrofrozen Potatoes | 6.81 | 6.81 | 8.00 | | 7.00 |
| Mushrooms | 25.00 | 25.00 | 24.00 | | |
| Onions (dry or intermediate moisture) | 6.00 | 6.00 | | 6.00 | 6.00 |
| Onions (fresh or frozen) | | | 15.00 | | |
| Broccoli | | | | 20.00 | 12.00 |
| Cauliflower | | | | 26.00 | 12.00 |
| Carrots | | | | 14.00 | 12.00 |
| | 100.00 | 100.00 | 100.00 | 100.00 | 100.00 |

These vegetable sauces were prepared by the following process:
1. Adding the water to a vessel equipped with a high shear agitator;
2. While agitating the water, adding the starch to form a smooth starch slurry;
3. Transferring the starch slurry to a steam jacketed kettle equipped with scraping agitators where it is heated to 190° F. and holding that temperature for 4 to 10 minutes;
4. Adding the citric acid to form a sauce;
5. Adding the vegetables to the sauce and blending until the mixture is uniform;
6. Heating the mixture to 120° F.;
7. Pumping the vegetable sauce through a vacuum chamber maintined at 10 inches Hg of vacuum; and
8. Pumping the vegetable sauce through a continuous heating, cooling, and packaging system that continuously heats the vegetable sauce to about 215° F., cools it to about 80° F., and aseptically fills the sauce into presterilized packages.

Although the invention has been described in detail for the purpose of illustration, it is understood that such detail is solely for that purpose, and variations can be made therein by those skilled in the art without departing from the spirit and scope of the invention which is defined by the following claims.

I claim:
1. A process of preparing biologically stable vegetables comprising:
   mixing a starch and water to form a slurry;
   cooking the slurry at a temperature of 180° F. to 240° F.;
   adding a food grade acidulent to the cooked slurry to form a sauce;
   adding vegetables to said sauce to form a vegetable sauce having a pH of 4.1 to 4.6;
   heating said vegetable sauce; and
   cooling said vegetable sauce.
2. A process according to claim 1, wherein said starch is an acid resistant modified food starch.
3. A process according to claim 1, wherein said food grade acidulent is selected from the group consisting of acetic acid, lactic acid, malic acid, citric acid, tartaric acid, fumaric acid, lemon juice, vinegar, and mixtures thereof.
4. A process according to claim 3, wherein said food grade acidulent is citric acid.

5. A process according to claim 1, wherein said vegetables are selected from the group consisting of peppers, onions, peas, beans, carrots, cauliflower, broccoli, eggplant, chives, mushrooms, potatoes, chiles, tomatoes, and mixtures thereof.

6. A process according to claim 1, wherein the weight ratio of said vegetables to said sauce is 1:1 to 4:1.

7. A process according to claim 1, wherein said sauce contains 3.5 to 6.5 wt.% of said starch, 0.40 to 1.00 wt.% of said food grade acidulent, and 92.8 to 96.10 wt.% of said water.

8. A process according to claim 1, wherein said heating elevates said vegetable sauce to a temperature of 200° to 240° F.

9. A process according to claim 1, wherein said cooling lowers said vegetable sauce to a temperature of less than 150° F.

10. A process according to claim 1 further comprising:
aseptically packaging said vegetable sauce after said cooling.

11. A process according to claim 10 further comprising:
vacuum treating said vegetable sauce before said heating.

12. A process according to claim 1, wherein said vegetable sauce has a pH of 4.6 or less.

13. A process of preparing a vegetable omelette mix with biologically stable vegetables comprising:
mixing a starch and water to form a slurry;
cooking the slurry at a temperature of 180° F. to 240° F.;
adding a food grade acidulent to the cooked slurry to form a sauce;
adding vegetables to said sauce to form a vegetable sauce having a pH of 4.1 to 4.6;
heating said vegetable sauce;
cooling said vegetable sauce; and
adding said vegetable sauce to a liquid egg product to form a vegetable omelette mix.

14. A process according to claim 13, wherein said starch is an acid resistant modified food starch.

15. A process according to claim 13, wherein said food grade acidulent is selected from the group consisting of acetic acid, lactic acid, malic acid, citric acid, tartaric acid, fumaric acid, lemon juice, vinegar, and mixtures thereof.

16. A process according to claim 13, wherein said vegetables are selected from the group consisting of peppers, onions, peas, beans, carrots, cauliflower, broccoli, eggplant, chives, mushrooms, potatoes, tomatoes, chiles, and mixtures thereof.

17. A process according to claim 13, wherein said sauce contains 3.5 to 6.5 wt.% of said starch, 0.40 to 1.0 wt.% of said food grade acidulent, and 92.8 to 96.10 wt.% of said water.

18. A process according to claim 13, wherein said liquid egg product is a whole, shelled, raw or pasteurized egg.

19. A process according to claim 13, wherein said liquid egg product is a low cholesterol egg product.

20. A process according to claim 19, wherein said low cholesterol egg product comprises:
egg whites and
coloring.

21. A process according to claim 20, wherein said coloring comprises a mixture of beta-carotene and F D & C yellow #5 and #6 in an amount that imparts the characteristic color of whole eggs to said low cholesterol egg product.

22. A process according to claim 20, wherein said low cholesterol egg product further comprises:
xanthan gum in an amount sufficient to impart freeze-thaw stability to said egg product.

23. A process according to claim 22, wherein said xanthan gum is blended with guar gum and carrageenan.

24. A process according to claim 13, wherein said vegetable sauce has a pH of 4.6 or less.

* * * * *